United States Patent
Delaney

(10) Patent No.: US 8,937,654 B2
(45) Date of Patent: Jan. 20, 2015

(54) MACHINE VISION INSPECTION SYSTEM COMPRISING TWO CAMERAS HAVING A ROTATIONAL OFFSET

(75) Inventor: Mark Lawrence Delaney, Shoreline, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 381 days.

(21) Appl. No.: 13/592,283

(22) Filed: Aug. 22, 2012

(65) Prior Publication Data

US 2014/0055604 A1 Feb. 27, 2014

(51) Int. Cl.
*H04N 7/18* (2006.01)

(52) U.S. Cl.
USPC ............... 348/94; 348/95; 382/151; 700/192

(58) Field of Classification Search
USPC ................. 348/78, 79, 86–88, 92, 94, 95, 348/125–128, 131, 133, 135, 139; 382/141, 382/142–147, 149, 151, 152, 154; 700/186, 700/192, 193, 259; 250/559.05–559.09; 324/555, 537, 750.16; 356/498, 508, 356/511, 237.2
See application file for complete search history.

(56) References Cited

U.S. PATENT DOCUMENTS

| | | | | |
|---|---|---|---|---|
| 4,937,766 A | * | 6/1990 | Deppe et al. | 382/154 |
| 5,604,583 A | * | 2/1997 | Byron et al. | 356/124 |
| 5,978,521 A | * | 11/1999 | Wallack et al. | 382/294 |
| 6,009,189 A | * | 12/1999 | Schaack | 382/154 |
| 6,101,268 A | * | 8/2000 | Gilliland | 382/152 |
| 6,542,180 B1 | | 4/2003 | Wasserman | |
| 7,324,682 B2 | | 1/2008 | Wasserman | |
| 7,454,053 B2 | | 11/2008 | Bryll | |
| 7,627,162 B2 | | 12/2009 | Blanford | |
| 8,111,905 B2 | | 2/2012 | Campbell | |
| 8,111,938 B2 | | 2/2012 | Bryll | |
| 2004/0012775 A1 | * | 1/2004 | Kinney et al. | 356/237.2 |
| 2005/0035313 A1 | * | 2/2005 | Garssen et al. | 250/559.33 |
| 2007/0096763 A1 | * | 5/2007 | Ehrmann et al. | 324/765 |
| 2008/0085047 A1 | * | 4/2008 | Baker et al. | 382/141 |
| 2009/0028423 A1 | * | 1/2009 | Sandstrom et al. | 382/149 |

OTHER PUBLICATIONS

Mikulastik, P., et al. "Error Analysis of Subpixel Edge Localisation," in E. Damiani, et al. (eds.), Advanced Internet Based Systems and Applications 2-9525435-1, 2nd International Conference on Signal-Image Technology and Internet-Based Systems (SITIS 2006), Hammamet, Tunisia, Dec. 17-21, 2006, pp. 531-542.

(Continued)

*Primary Examiner* — Victor Kostak
(74) *Attorney, Agent, or Firm* — Christensen O'Connor Johnson Kindness PLLC

(57) ABSTRACT

A machine vision inspection system comprises an optical portion providing an image of a field of view of a workpiece which may be a magnified image. A first camera and a second camera provide first and second images of a shared or common field of view of the workpiece and are arranged such that the orientation of the common field of view imaged in the first camera is rotated relative to the orientation of the common field of view imaged in the second camera. Signal processing provides an edge measurement of an edge feature within the common field of view and determines which of the first and second images is used as a basis for the edge measurement based on whether their respective edge orientation (with respect to the pixel array of each camera) differs from the pixel array orientation of their associated camera by an orientation difference threshold amount.

12 Claims, 6 Drawing Sheets

(56) References Cited

OTHER PUBLICATIONS

"QVPAK 3D CNC Vision Measuring Machine: Operating Guide," Version 2.0, Manual No. 4911GB, Series No. 359, Mitutoyo Corporation & Micro Encoder Inc., Kanagawa, Japan, Sep. 1996, 86 pages.

"QVPAK 3D CNC Vision Measuring Machine: User's Guide," Version 7.1, 2d ed., Manual No. 99MCB225A1, Series No. 359, Mitutoyo Corporation & Micro Encoder Inc., Kanagawa, Japan, Sep. 2003, 370 pages.

* cited by examiner

MACHINE VISION INSPECTION SYSTEM COMPRISING TWO CAMERAS HAVING A ROTATIONAL OFFSET

FIELD

The invention relates generally to machine vision inspection systems and more particularly to precise edge location determination.

BACKGROUND

Precision machine vision inspection systems (or "vision systems" for short) can be utilized to obtain precise dimensional measurements of inspected objects and to inspect various other object characteristics. Such systems may include a computer, a camera and optical system, and a precision stage that is movable in multiple directions to allow workpiece inspection. One exemplary prior art system that can be characterized as a general-purpose "off-line" precision vision system is the commercially available QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This type of system is able to use a microscope-type optical system and move the stage so as to provide inspection images of either small or relatively large workpieces at various magnifications.

General purpose precision machine vision inspection systems, such as the QUICK VISION™ system, are also generally programmable to provide automated video inspection. Such systems typically include GUI features and predefined image analysis "video tools" such that operation and programming can be performed by "non-expert" operators. For example, U.S. Pat. No. 6,542,180, which is incorporated herein by reference in its entirety, teaches a vision system that uses automated video inspection including the use of various video tools. Exemplary video tools include edge location tools, which are sometimes referred to as "box tools," which are used to locate an edge feature of a workpiece. For example, commonly assigned U.S. Pat. No. 7,627,162, which is incorporated herein by reference in its entirety, teaches various applications of box tools.

It is known to some experts in the art of precision machine vision inspection that when sharp edge features (e.g., binary edges) are aligned with an axis of a pixel array of a camera, precision edge location measurements suffer from digitization errors (e.g., due to sub-Nyquist sampling) and subpixel resolution measurements may suffer related measurement errors. In a paper titled "Error Analysis of Subpixel Edge Localization," by Patrick Mikulastik, et al., the authors approximated a higher resolution sampling rate for straight edges by intentionally rotating a straight edge relative to the pixel columns in a camera, such that various pixel rows "sample" the edge with a slight offset relative to one another. However, precision machine vision inspection systems are often programmed and operated by relatively unskilled users that are not aware of such considerations, and such a technique may not be comprehensible and/or practical for such users. A precision machine vision system that helps unskilled users avoid the errors outlined above would be desirable. A machine vision inspection system configured such that these types of digitization errors are reduced or eliminated without requiring a user to be explicitly aware of such errors would be most desirable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Many machine vision inspection system users tend to instinctively align edges to be measured such that are nearly vertical or horizontal in an image. This tends to align the edge with the columns or rows in a pixel array of the system camera, which may produce errors as outlined above and described in greater detail below.

Disclosed herein are a system and method for suppressing potential edge location measurement errors that depend on edge feature alignment in a machine vision inspection system. The systems and methods are configured for detecting strong alignment of an edge feature with an axis of a pixel array (e.g., a row or column axis) in a machine vision inspection system and compensating for and/or avoiding errors associated with this alignment in a fast and convenient manner. This results in better repeatability and accuracy in edge location measurements, particularly for edges to be located with subpixel resolution and accuracy. The related operations of the system and method may be transparent to a user, and therefore the system and method disclosed herein do not require user awareness or operations that may be beyond the scope of abilities of a relatively unsophisticated user.

A machine vision inspection system is disclosed. The machine vision inspection system comprises an optical portion configured to provide an image of a field of view of a workpiece (which may be a magnified image), a first camera configured to provide a first image of the field of view of the workpiece, and a second camera configured to provide a second image of the field of view of the workpiece. The first camera and the second camera share a common field of view, and the first and second camera are arranged such that the orientation of the common field of view imaged in the first camera is rotated relative to the orientation of the common field of view imaged in the second camera. The machine vision inspection system comprises signal processing which provides an edge measurement of an edge feature within the common field of view imaged by each camera and determines which of the first and second images is used as a basis for the edge measurement based on whether their respective edge orientation differs from their pixel array orientation of their associated camera by an orientation difference threshold amount. In some embodiments, a respective edge orientation is determined by fitting a line to the edge points of a respective edge and determining a difference in orientation between the fitted line and a known orientation of pixel axis of the associated camera. In other embodiments, it is determined that respective edge orientation differs from the pixel array orientation of their associated camera by an orientation difference threshold amount by analyzing the location of the detected edge points along respective scan lines of a video tool used to measure the respective edge, and determining that the respective edge orientation differs from the pixel array orientation of their associated camera by the orientation difference threshold when the location of the detected edge points along respective scan lines of the video tool provides a combined sampling density corresponding to the orientation difference threshold amount or more.

In some embodiments, the orientation of the common field of view imaged in the first camera is rotated relative to the orientation of the common field of view imaged in the second camera by at least one degree.

In some embodiments, the orientation of the common field of view imaged in the first camera is rotated relative to the orientation of the common field of view imaged in the second camera by at most ten degrees.

In some embodiments, the orientation of the common field of view imaged in the first camera is rotated relative to the orientation of the common field of view imaged in the second camera by at least twice the amount of the orientation difference threshold.

A method for detecting strong alignment between workpiece edge features and a row or column of a pixel array in a camera of a machine vision inspection system and compensating and/or avoiding errors associated with the strong alignment is disclosed. The method comprises providing a machine vision inspection system comprising an optical portion, a first camera, and a second camera, wherein the first camera and the second camera share a common field of view and the first and second camera are arranged such that the orientation of the common field of view imaged in the first camera is rotated relative to the orientation of the common field of view imaged in the second camera. The method further comprises providing an image of a field of view of a workpiece with the optical portion (which may be a magnified image), obtaining a first image of the field of view of the workpiece with the first camera, obtaining a second image of the field of view of the workpiece with the second camera, and providing an edge measurement of an edge feature within the common field of view based on at least one of the first and second images. Providing the edge measurement comprises determining which of the first and second images is used as a basis for the edge measurement based on whether their respective edge orientation differs from their pixel array orientation of their associated camera by an orientation difference threshold amount. It will be appreciated that the systems and methods outlined above are advantageous for precision machine vision inspection operations (e.g., for machine vision inspection systems that include 1×, 5×, 10× magnification, etc.) and particularly advantageous for edge location determinations with subpixel resolution and/or accuracy (e.g., at the micron or submicron level).

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
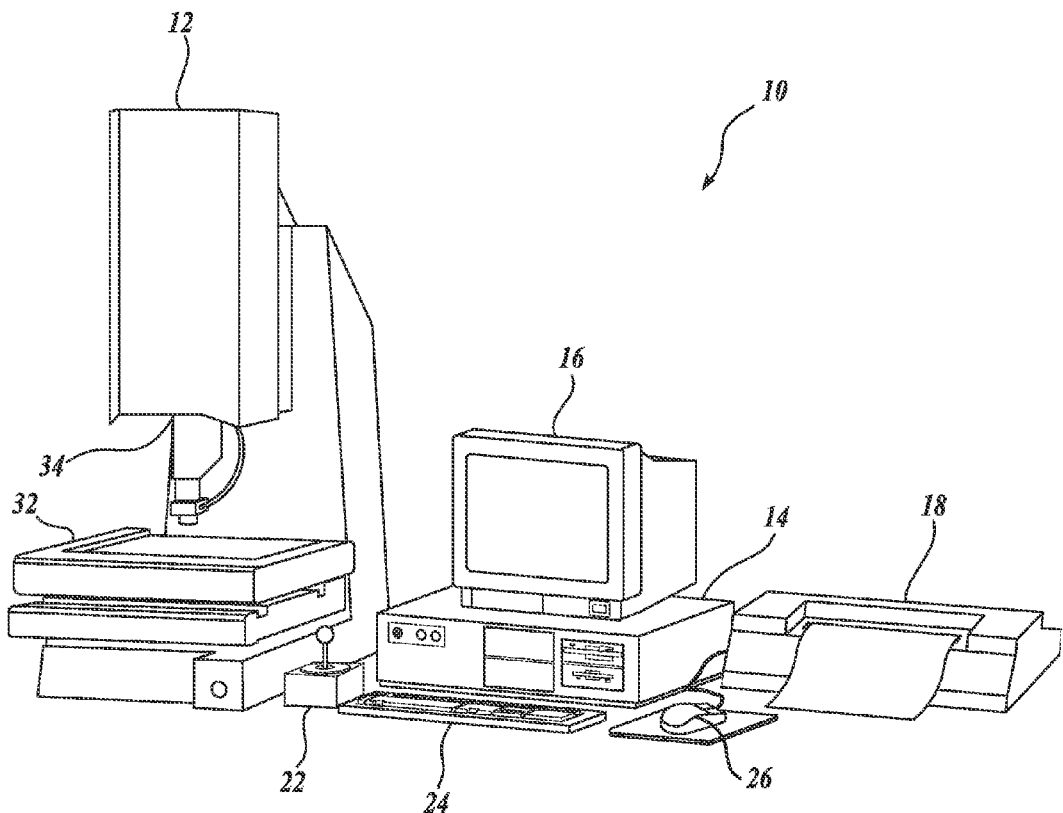
FIG. 1 is a diagram showing various typical components of a general purpose precision machine vision inspection system.

FIG. 1 is a block diagram of one exemplary machine vision inspection system 10 usable in accordance with methods described herein. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10.

The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in commonly assigned U.S. Pat. Nos. 7,454,053, 7,324,682, 8,111,905, and 8,111,938, which are each incorporated herein by reference in their entireties.

Figure 2:
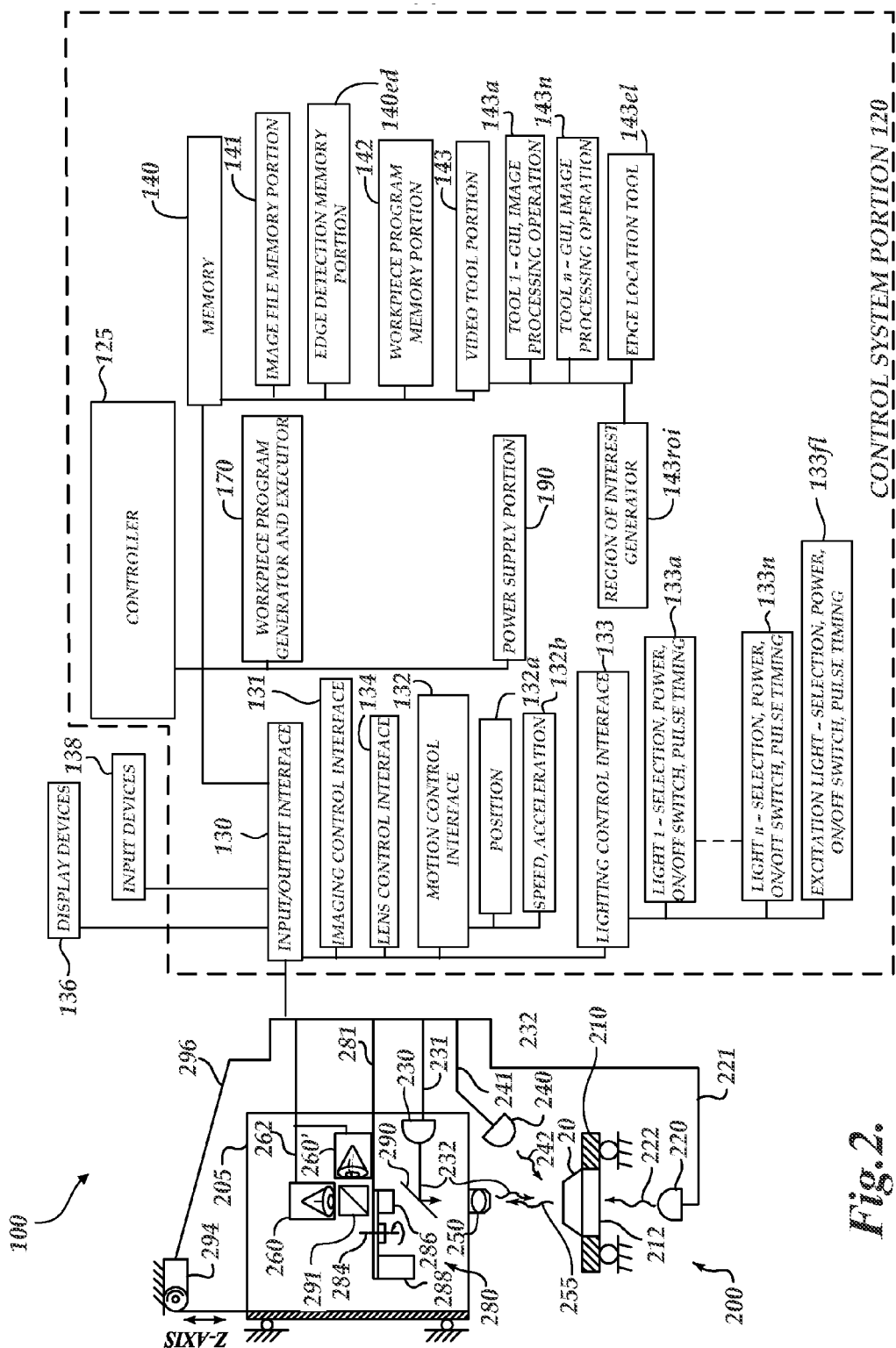
FIG. 2 is a block diagram of a control system portion and a vision components portion of a machine vision inspection system similar to that of FIG. 1, including two cameras configured according to principles described herein.

FIG. 2 is a block diagram of a control system portion 120 and a vision components portion 200 of a machine vision inspection system 100 similar to the machine vision inspection system of FIG. 1, and including two cameras configured according to principles described herein. As will be described in more detail below, the control system portion 120 is utilized to control the vision components portion 200. The vision components portion 200 includes an optical assembly portion 205, light sources 220, 230, and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a first camera 260, a second camera 260', a beam splitter 291, an interchangeable objective lens 250, and may include a turret lens assembly 280 having lenses 286 and 288. Alternatively to the turret lens assembly, a fixed or interchangeable magnification-altering lens, or a zoom lens configuration, or the like, may be included. An interchangeable lens may be interchanged manually or automatically.

The optical assembly portion 205 is controllably movable along a Z-axis that is generally orthogonal to the X and Y axes, by using a controllable motor 294 that drives an actuator to move the optical assembly portion 205 along the Z-axis to change the focus of the image of the workpiece 20. The controllable motor 294 is connected to the input/output interface 130 via a signal line 296.

A workpiece 20, or a tray or fixture holding a plurality of workpieces 20, which is to be imaged using the machine vision inspection system 100 is placed on the workpiece stage 210. The workpiece stage 210 may be controlled to move relative to the optical assembly portion 205, such that the interchangeable objective lens 250 moves between locations on a workpiece 20, and/or among a plurality of workpieces 20. One or more of a stage light 220, a coaxial light 230, and a surface light 240 (e.g., a ring light) may emit source light 222, 232, and/or 242, respectively, to illuminate the workpiece or workpieces 20. The light source 230 may emit light 232 along a path including a mirror 290. The source light is reflected or transmitted as workpiece light 255, and the workpiece light used for imaging passes through the interchangeable objective lens 250 and the turret lens assembly 280 and is gathered by the first camera 260 and the second camera 260'. The images of the workpiece(s) 20, from the first camera 260 and the second camera 260', are output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284 to select a turret lens, through a signal line or bus 281.

The first camera 260 and the second camera 260' are configured to provide first and second images (which may be magnified images) of a shared field of view of the workpiece 20, and the first and second camera are arranged such that the orientation of the common field of view imaged in the first camera is rotated relative to the orientation of the common field of view imaged in the second camera, as described in greater detail below.

As shown in FIG. 2, in various exemplary embodiments, the control system portion 120 includes a controller 125, the input/output interface 130, a memory 140, a workpiece program generator and executor 170, and a power supply portion 190. Each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 may include a position control element 132a, and a speed/acceleration control element 132b, although such elements may be merged and/or indistinguishable. The lighting control interface 133 includes lighting control elements 133a-133n, and 133fl which control, for example, the selection, power, on/off switch, and strobe pulse timing if applicable, for the various corresponding light sources of the machine vision inspection system 100.

The memory 140 may include an image file memory portion 141, a workpiece program memory portion 142 that may include one or more part programs, or the like, and a video tool portion 143. The video tool portion 143 includes video tool portion 143a and other video tool portions (e.g., 143n), which determine the GUI, image processing operation, etc., for each of the corresponding video tools, and a region of interest (ROI) generator 143roi that supports automatic, semi-automatic and/or manual operations that define various ROIs that are operable in various video tools included in the video tool portion 143. Additionally, the video tool portion 143 includes an edge location tool 143e1, which may operate according to edge location operations described with respect to the "box tool" in the QVPAK 3D CNC Vision Measuring Machine Operation Guide, for example, and which may incorporate signal processing to implement the methods disclosed herein for using the images from the first and second cameras 260 and 260'. In particular, the control system portion 120 comprises signal processing which is used in association with the edge location tool 143e1 to provide an edge measurement of an edge feature within the common field of view imaged by each of the first and second cameras, and determines which of the first and second images is used as a basis for the edge measurement based on whether their respective edge orientation differs from the pixel array orientation of their associated camera by an orientation difference threshold amount, as described in greater detail below.

In the context of this disclosure, and as known by one of ordinary skill in the art, the term video tool generally refers to a relatively complex set of automatic or programmed operations that a machine vision user can implement through a relatively simple user interface (e.g., a graphical user interface, editable parameter windows, menus, and the like), without creating the step-by-step sequence of operations included in the video tool or resorting to a generalized text-based programming language, or the like. For example, a video tool may include a complex pre-programmed set of image processing operations and computations which are applied and customized in a particular instance by adjusting a few variables or parameters that govern the operations and computations. In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image procession operations of a particular instance of a video tool. It should be noted that the visible user interface features are sometimes referred to as the video tool, with the underlying operations being included implicitly.

The signal lines or busses 221, 231, and 241 of the stage light 220, the coaxial lights 230 and 230', and the surface light 240, respectively, are all connected to the input/output interface 130. The signal line 262 from the first camera 260 and the second camera 260' and the signal line 296 from the controllable motor 294 are connected to the input/output interface 130. In addition to carrying image data, the signal line 262 may carry a signal from the controller 125 that initiates image acquisition.

One or more display devices 136 (e.g., the display 16 of FIG. 1) and one or more input devices 138 (e.g., the joystick 22, keyboard 24, and mouse 26 of FIG. 1) can also be connected to the input/output interface 130. The display devices 136 and input devices 138 can be used to display a user interface, which may include various graphical user interface (GUI) features that are usable to perform inspection operations, and/or to create and/or modify part programs, to view the images captured by the first camera 260 and the second camera 260', and/or to directly control the vision system components portion 200.

In various exemplary embodiments, when a user utilizes the machine vision inspection system 100 to create a part program for the workpiece 20, the user generates part program instructions by operating the machine vision inspection system 100 in a learn mode to provide a desired image acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and inspection operations to automatically inspect that particular workpiece feature (that is, the corresponding feature in the corresponding location) on a run mode workpiece or workpieces which matches the representative workpiece used when creating the part program. The operations disclosed and claimed herein may be implemented during learn mode operations wherein it is determined which of the images from the first camera 260 and the second camera 260' is used as a basis for the edge measurement based on whether their respective edge orientation differs from the pixel array orientation of their associated camera by an orientation difference threshold amount. Thereafter, the part program may reflect that only the determined first and or second camera is used as a basis for the edge measurement during run mode.

Figure 3:
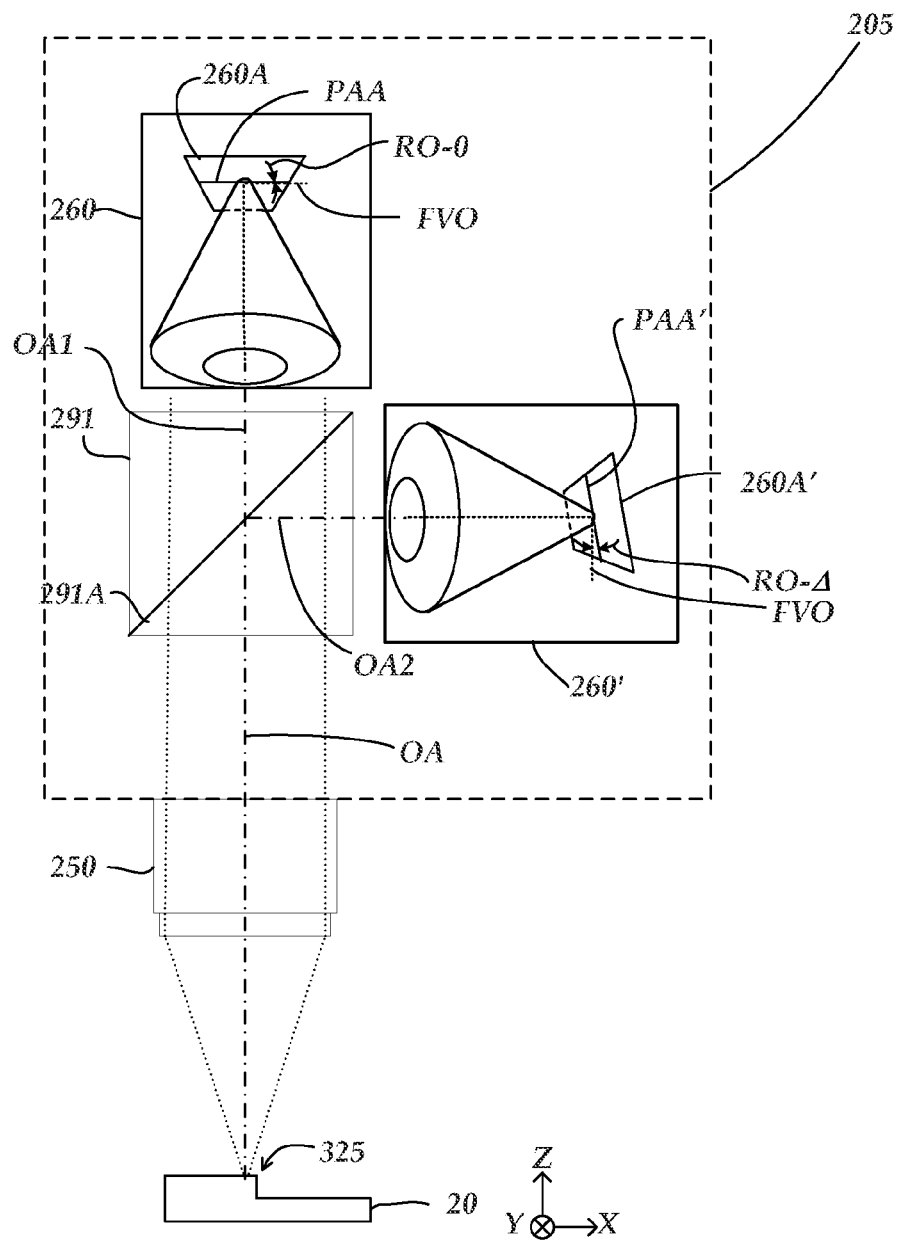
FIG. 3 is a schematic diagram of an optical portion of a machine vision inspection system including two cameras configured according to principles disclosed herein.

FIG. 3 is a schematic diagram showing selected portions of the optical assembly 205 of the machine vision inspection system 100 in greater detail, including two cameras configured according to the principles disclosed herein. FIG. 3 shows the first camera 260, the second camera 260', the beamsplitter 291 and the objective lens 250. For simplicity, illumination portions are not shown in FIG. 3. It should be appreciated that any suitable illumination portion or combination of illumination portions such as the stage light 220, the coaxial light 230, and the surface light 240 (shown in FIG. 2) may be used in conjunction with the components shown in FIG. 3.

The workpiece 20 comprising an edge feature 325 is placed in the field of view of the optical assembly 205. The optical assembly 205 provides an image (e.g., a magnified image, in some embodiments) of a field of view of the workpiece 20 along the optical axis OA. The beamsplitter 291 splits image light from the field of view of the workpiece 20 at a beamsplitting surface 291A and transmits and reflects image light along optical axes OA1 and OA2 at a partially reflective surface 291B in order to provide first and second image light to the first camera 260 and the second camera 260', respectively. The first camera 260 and the second camera 260' thus provide a first image and a second image of a shared or common field of view of the workpiece 20, including the edge feature 325. User interface and signal processing operations related to the first and second images provided by the components shown in FIG. 3 are described in greater detail below with respect to FIG. 4A and FIG. 4B.

As schematically illustrated in the embodiment shown in FIG. 3, the common field of view is imaged onto the array detector 260A of the first camera 260 with a field of view orientation FVO (a rotational orientation about the optical axis OA1) that has a rotational offset RO-0 relative to a pixel array axis PAA orientation (a rotational orientation of a row or column axis of the pixel array about the optical axis OA1) of the first camera. In the example shown in FIG. 3, the rotational offset RO-0 is zero. Stated another way, the rotational offset of the first camera may be defined to be the reference for rotational offsets, and its rotational offset may be defined to be zero. The common field of view is imaged onto the array detector 260A' of the second camera 260 with a field of view orientation FVO (a rotational orientation about the optical axis OA2) that has a different rotational offset RO-Δ relative to a pixel array orientation PAA' (a rotational orientation of a row or column axis of the pixel array about the optical axis OA2) of the second camera. Stated another way, the rotational offset of the second camera may be defined relative to the reference orientation of the first camera, and it this example it's rotational offset is relative to the first camera maybe a rotational offset RO-Δ, which may cause the image of the FOV to appear to be rotated by the rotational offset RO-Δ in the second camera 260A'.

It should be appreciated that this is one embodiment for conveniently arranging the first and second camera in order such that the first camera 260 and the second camera 260' share a common field of view and the orientation of the common field of view imaged in the first camera 260 is rotated relative to the orientation of the common field of view imaged in the second camera 260'. Stated another way, the first and second cameras are arranged such that the orientation FVO of the common field of view imaged in the first camera 260 is rotated relative to the pixel array axis PAA orientation of the first camera 260 by a first amount RO-0 and the orientation FVO of the common field of view imaged in the second camera 260' is rotated relative to the pixel array axis PAA' orientation of the second camera 260' by a second amount RO-X that is different than the first amount.

This embodiment corresponds to one aspect of this invention, in that the orientation of an edge feature imaged in the first camera will have a first orientation difference relative to row or column axes of the pixel array of the first camera, and that edge feature imaged in the second camera will have a different orientation difference relative to the row and/or column axes of the pixel array of the second camera. As outlined previously and described further below, for precise (e.g., sub-pixel) location of sharp edges it is desirable that the orientation difference between an edge feature and the row and/or column axes of the pixel array exceed an orientation difference threshold amount. If the pixel array orientations in the cameras are sufficiently different, then it is ensured that an edge imaged in both cameras will exceed the required orientation difference threshold amount in at least one of the cameras.

Since the digitization or sub-sampling errors discussed previously are to be avoided by, in effect, using multiple respective scan lines that have different respective pixel locations across edge intensity profile in order to sample the edge intensity profile with high spatial resolution, the orientation difference threshold amount may in some embodiments depend on the length of the edge and/or the scan line spacing. For example, if edge detection scan lines are spaced 10 microns apart, and it is desired to sample at spatial intervals of 0.5 microns or less across an imaged edge profile, then the required orientation difference threshold amount may be approximately $\tan^{-1}(0.5/10)=2.86$ degrees. However, if the edge is long enough to allow edge detection scan lines spaced 40 microns apart, then the required orientation difference threshold amount may be approximately $\tan^{-1}(0.5/40)=0.716$ degrees. In practice, an unpredictable variety of measurement situations may be encountered, and a practical default global orientation difference threshold may be used in some embodiments, and/or for the purpose setting the orientation difference between the pixel arrays of the first and second cameras. For example, in some embodiments or applications a default orientation difference threshold of at least one degree, two degrees, four degrees, or more, may be used.

In some embodiments, the orientation difference between the pixel arrays of the first and second cameras may be at least as large as one degree, two degrees, four degrees, or more. In some embodiments, the orientation difference between the pixel arrays of the first and second cameras may be at least as large as two times a default orientation difference threshold amount, such that any imaged edge feature is insured to exceed the default orientation difference threshold amount for at least one of the cameras. In some embodiments, the orientation difference between the pixel arrays of the first and second cameras may be limited to at most 10 degrees, which may simplify certain signal processing considerations related to scan line and or edge tool orientations relative to the row and/or column axes of the pixel arrays of the first and/or second camera. It will be appreciated that the camera and beamsplitter arrangement shown in FIG. 3 is exemplary only, and not limiting. Various other arrangements that provide the functional characteristics outlined above (e.g., using other beam splitter shapes, additional minors, pixel arrays in other planes, additional lenses, or the like) will be apparent to one of ordinary skill in the art based on the teachings disclosed herein.

Figure 4A:
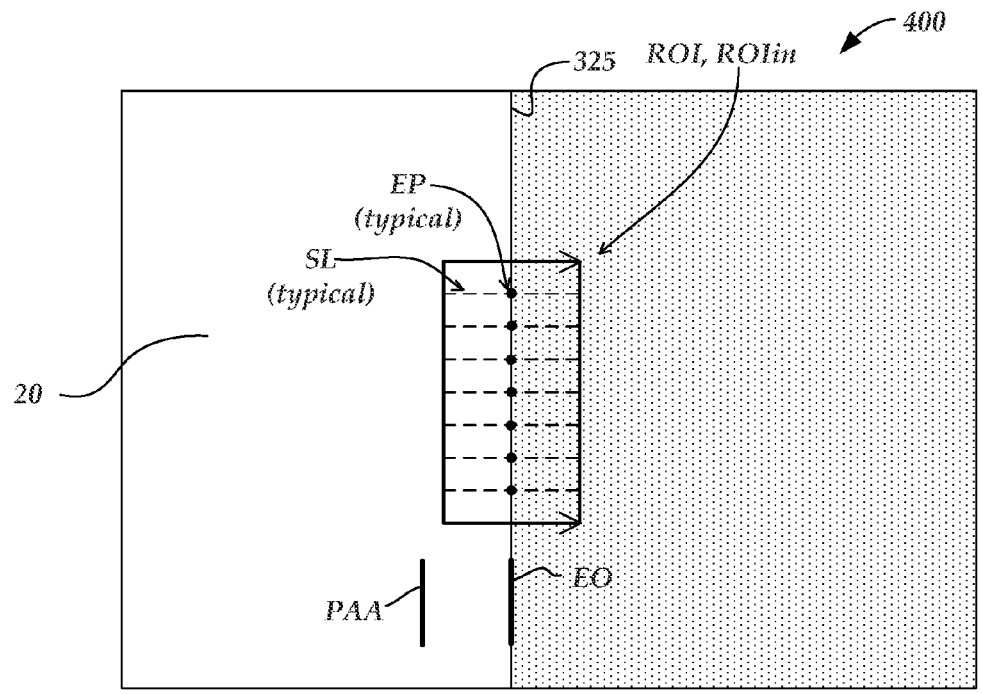
FIGS. 4A and 4B show and compare an imaged field of view as imaged in first and second cameras, as well as additional features clarifying one embodiment of a camera arrangement and related machine vision inspection system features (e.g., user interface features) in accordance with principles disclosed herein.
Figure 4B:
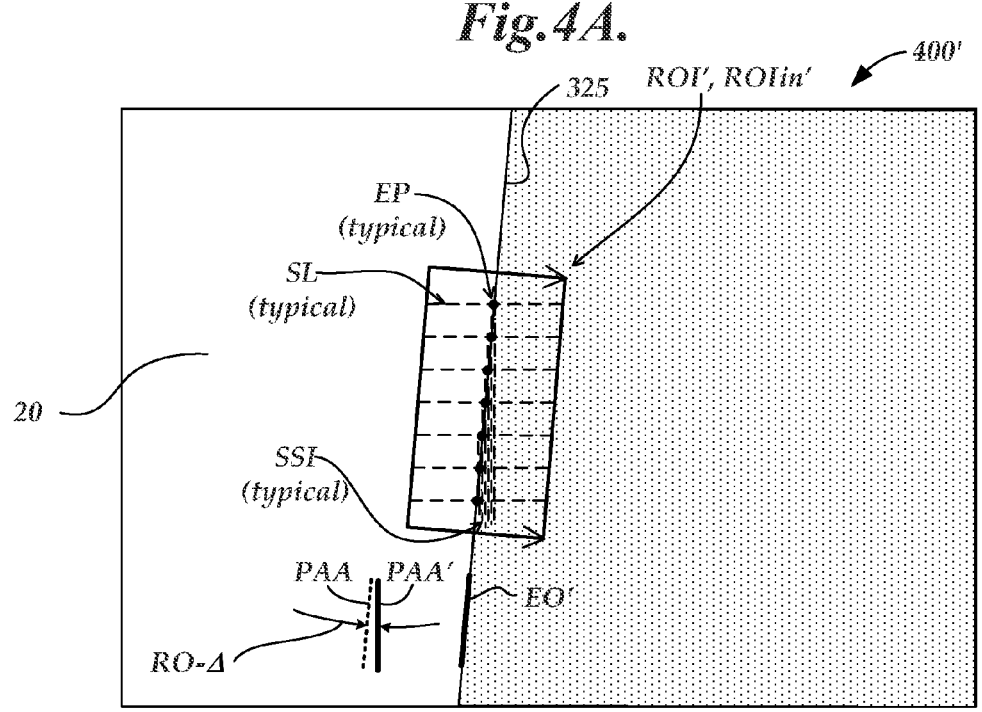

FIGS. 4A and 4B show and compare an imaged field of view (or image, for short) 400 and 400' as imaged in first and second cameras, respectively, as well as additional features clarifying one embodiment of a camera arrangement and related machine vision inspection system features (e.g., user interface features) in accordance with principles disclosed herein (e.g., the camera arrangement illustrated in FIG. 3). FIG. 4A shows the imaged field of view 400 imaged by the first camera 260, which may be included in a user interface of the machine vision inspection system 100 including a region of interest indicator ROIin (e.g., associated with the edge location tool 143el described with reference to FIG. 2). For purposes of explanation, various features previously described with reference to FIG. 3 are superimposed in FIG. 4A for reference, although such features may not be included in the user interface or displayed to the user.

As shown in FIG. 4A, the orientation of the pixel array axis PAA (e.g., the pixel column direction axis) relative to the image is represented by a superimposed line, which is shown to be aligned parallel to a vertical border of the image 400. An edge orientation EO of the edge 325 in the image 400 is also represented by a solid line. For purposes of explanation, exemplary analyzed scan lines SL and edge points EP are depicted in FIG. 4A. The analyzed scan lines may be oriented along the pixel row direction in this particular embodiment. Furthermore, it is seen that the edge orientation EO and the orientation of the pixel array axis PAA are nearly identical. As a result, the location of the edge points EP are at the same pixel location across each scan, or stated another way the edge intensity profile is "sampled" by pixels at the same spatial location across the edge intensity profile in each scan line. Thus, each scan line gives approximately the same information and the sharp edge 325 is under sampled according to FIG. 4A. As a result, sub pixel edge location errors may arise due this under sampling, as previously outlined and as described in greater detail below with reference to FIG. 5.

FIG. 4B shows the imaged field of view 400' imaged by the second camera 260'. A region of interest ROI' in the imaged field of view 400' corresponds to the region of interest ROI in the field of view 400. It should be understood that features illustrated in FIG. 4B are for purposes of explanation, and need not be displayed in a user interface. As shown in FIG. 4B, the orientation of the pixel array axis PAA' (e.g., the pixel column direction axis of the pixel array of the second camera) relative to the image is represented by a superimposed line, which is shown to be aligned parallel to a vertical border of the image 400'. The rotational offset RO-Δ of the pixel array axis PAA' of the second camera is shown relative to the pixel array axis PAA of the first camera, for reference. An edge orientation EO' of the edge 325 in the image 400' is also represented by a solid line. It will be understood that whereas the edge orientation of the edge 325 is aligned with the pixel array axis PAA of the first camera in this example, due to the rotational offset RO-Δ of the pixel array of the second camera relative to the first, the edge orientation EO' of the edge 325 has the rotational offset RO-Δ relative to the pixel array of the second camera.

For purposes of explanation, exemplary analyzed scan lines SL and edge points EP are depicted in FIG. 4B. In this embodiment, the location of the ROI is conveniently made identical relative to the edge 325. In one embodiment, this is easily accomplished by calibrating the effective rotational and translational offset of each camera relative to a machine coordinate system, and expressing the parameters of the ROI in terms of the machine coordinate system. However, despite the apparent rotation of the ROI', the signal processing may be configured in this particular embodiment such that the analyzed scan lines are oriented along the pixel row direction of the second camera. As a result, in contrast to the example described with reference to the first camera in FIG. 4A, as indicated by the spatial sampling indicator lines SSI the location of the edge points EP are at different pixel locations across each scan line in FIG. 4B. Thus, each scan line gives different information and the intensity profile of the sharp edge 325 may be densely sampled according to FIG. 4B. Stated another way, by using the plurality of scan lines, the edge intensity profile is "sampled" by pixels at closely spaced locations across the edge intensity profile. As a result, sub pixel edge location errors that might otherwise arise due to under sampling are suppressed.

In the embodiment shown in FIG. 4B, the scanlines SL follow the pixel rows of the camera 260', and therefore they are rotated by the same rotational offset RO-Δ. Alternatively, the scanlines SL may be interpolated scanlines that do not follow the pixel rows of the camera 260'. Such scanlines may be determined as disclosed in commonly assigned U.S. Pat. No. 7,657,713, which is hereby incorporated by reference in entirety, and may be rotated differently between the first camera 260 and the second camera 260' to fulfill the principles disclosed herein. In the embodiment shown in FIG. 4B, the location of the region of interest ROI' is conveniently made identical relative to the edge 325, in comparison to the region of interest ROI shown in FIG. 4A. However, in various embodiments, this is not required. All that is necessary is that edge points are detected in the second image over an approximately similar segment of the edge 325 using scanlines that are differently oriented relative to the edge 325 than the scanlines SL shown in FIG. 4A.

Having the second camera rotationally offset relative to the first camera insures that the intensity profile of any sharp straight edge is always appropriately oriented for dense spatial sampling in at least one of the cameras. In the embodiment shown in FIG. 4A and FIG. 4B, the field of view image 400 and the field of view image 400' share a common field of view for providing an edge measurement of the edge feature 325.

In operation, the optical assembly portion 205 provides an image (e.g., a magnified image) of a field of view of a workpiece and more specifically the edge feature 325. The first camera 260 provides a first image of the field of view of the edge feature 325 and the second camera 260' provides a second image of the field of view of the workpiece. The machine vision inspection system 100 comprises signal processing which provides an edge measurement of the edge feature 325 within the common field of view imaged by the first camera 260 and the second camera 260', and determines which of the first and second images is used as a basis for the edge measurement based on whether their respective edge orientation differs from their pixel array orientation of their associated camera by an orientation difference threshold amount. The considerations related to using various orientation difference threshold amounts have been outlined previously.

In the embodiment shown in FIG. 4A and FIG. 4B, the edge orientation EO is strongly aligned with the orientation of the pixel array axis PAA of the first camera 260 and thus, the edge orientation EO will differ from the orientation of the pixel array axis PAA of the first camera 260 by less than a desirable orientation difference threshold, indicating the edge 325 may be undersampled. In contrast, the edge orientation EO' differs from the orientation of the pixel array axis PAA' of the second camera 260' by a significant amount and thus, the edge orientation EO' will differ from the orientation of the pixel array axis PAA' of the second camera 260' by more than a desirable orientation difference threshold (e.g., approximately 5 degrees in this example). This indicates that the edge may be densely sampled and accurately located in the second camera image, as outlined above. Therefore, the signal processing of the machine vision inspection system 100 determines that the second image corresponding to the field of view 400' may be used as a basis for an edge measurement of the edge feature 325, on this basis.

In some embodiments, a respective edge orientation is determined by signal processing that includes fitting a line to the edge points of a respective edge, and determining a difference in orientation between the fitted line and a known orientation of pixel axis of the associated camera. In other embodiments, it is determined that the respective edge orientation differs from the pixel array orientation of their associated camera by an orientation difference threshold amount by signal processing that includes analyzing the location of the detected edge points along respective scan lines of a video tool used to measure the respective edge, and determining that the respective edge orientation differs from the pixel array orientation of their associated camera by the orientation difference threshold when the location of the detected edge points along respective scan lines of the video tool provides a combined sampling density corresponding to the orientation difference threshold amount, or more.

Figure 5:
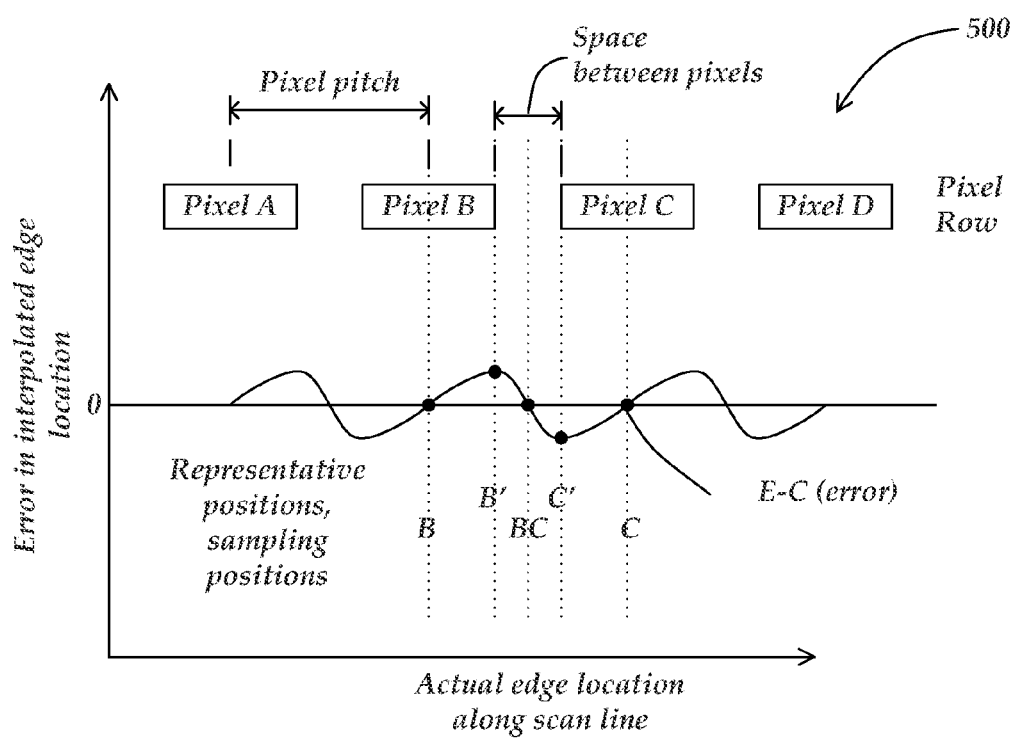
FIG. 5 is a chart showing a schematic error curve that qualitatively illustrates how undersampling or digitization may result in subpixel interpolation errors (undersampling errors) for a sharp or binary edge at various locations of the edge along a pixel array.

FIG. 5 is a chart 500 showing a schematic error curve 510 that qualitatively illustrates how undersampling or digitization may result in subpixel interpolation errors (e.g., the E-B, E-B', E-BC, E-C' and E-C) for a sharp or binary edge at various locations of the edge along a pixel row including pixels A-D. In particular, the qualitative error curve 510 shows errors for edge points (e.g., edge points EP, shown in FIGS. 4A and 4B) that are based on subpixel interpolation of pixel values along a scan line (e.g., scan lines SL, shown in FIGS. 4A and 4B) for different locations of a very sharp edge (e.g., a nearly "binary" edge) relative to pixels along the scan line.

For simplicity, we assume linear interpolation is used in this discussion. In this case, assuming a nearly binary edge, when the edge is in the space between pixels B and C, pixel B will have the high intensity value present on one side of the edge and pixel C will have the low intensity value present on the other side of the edge. Interpolation between these measured values (e.g., by identifying the edge as midway between these values, or as a maximum gradient point of the intensity profile indicated by the pixels) will indicate that the interpolated subpixel edge location is midway between pixels B and C. Thus, when the edge is actually located midway between pixels B and C then the interpolation error will be zero, as indicated at the error point E-BC. However, the adjacent pixels may be largely unresponsive to changes in the actual edge location when it is located in the space between pixels, so when the edge is actually located to the right of the midpoint between pixels B and C then the actual position is more positive than the interpolated edge location, producing a negative error as illustrated between the error points E-BC and E-C'.

As the actual edge location moves further to the right in FIG. 5, then pixel C begins to respond to the edge and its output begins to change, reducing the magnitude of the error as shown between the error points E-C' and E-C. Ideally, when the edge is actually located in the middle of pixel C, pixel D will have the high intensity value present on one side of the edge and pixel B will have the low intensity value present on the other side of the edge, and pixel C will have a value midway between those values and the interpolation error will be zero, as indicated at the error point E-C. The error curve between E-B and E-BC may be understood by analogy with the foregoing discussion. The error curve 510 repeats periodically at the pixel pitch, as illustrated.

Subpixel interpolation to determine edge points in each scan line as illustrated in FIGS. 4A and 4B may follow the behavior exhibited by the error curve 510. More complex interpolation, and/or less sharp edges may allow smaller peak to peak errors, but the curve will be qualitatively similar. In the example illustrated in FIG. 4A, each scan line samples the edge at approximately the same location along the scan line. Thus, each scan line includes the same systematic error point along the curve 510 (undersampling the edge intensity profile). As a result, a line location measurement of the entire edge 325 based on the image 400 may/will include that same systematic error when the edge points are analyzed to determine the line location.

In contrast, in the example illustrated in FIG. 4B, the edge is differently located relative to the pixels along each scan line (as indicated by the spatial sampling indicator lines SSI). Thus, each scan line includes a different error point along the curve 510 (densely sampling the edge intensity profile). Thus, in general, the location measurement of the entire edge 325 based on the image 400 may/will include some edge points with positive errors, some edge points with negative errors, and some with very small errors. When such edge points are analyzed to determine the line location (e.g., by a best-fit straight line location) the errors will tend to average out and/or compensate one another, the systematic digitization effect will be suppressed, and the line location will be accurately determined with subpixel resolution.

For example, for a near binary edge located from an image analogous to that shown in FIG. 4A, using a pixel array having a 10 micron pitch, a peak to peak systematic error as a function of edge location may be on the order of 4 microns. In contrast, for a near binary edge located from an image analogous to that shown in FIG. 4B, using the same pixel array, a peak to peak systematic error as a function of edge location may typically be 10 times smaller, or less.

Figure 6:
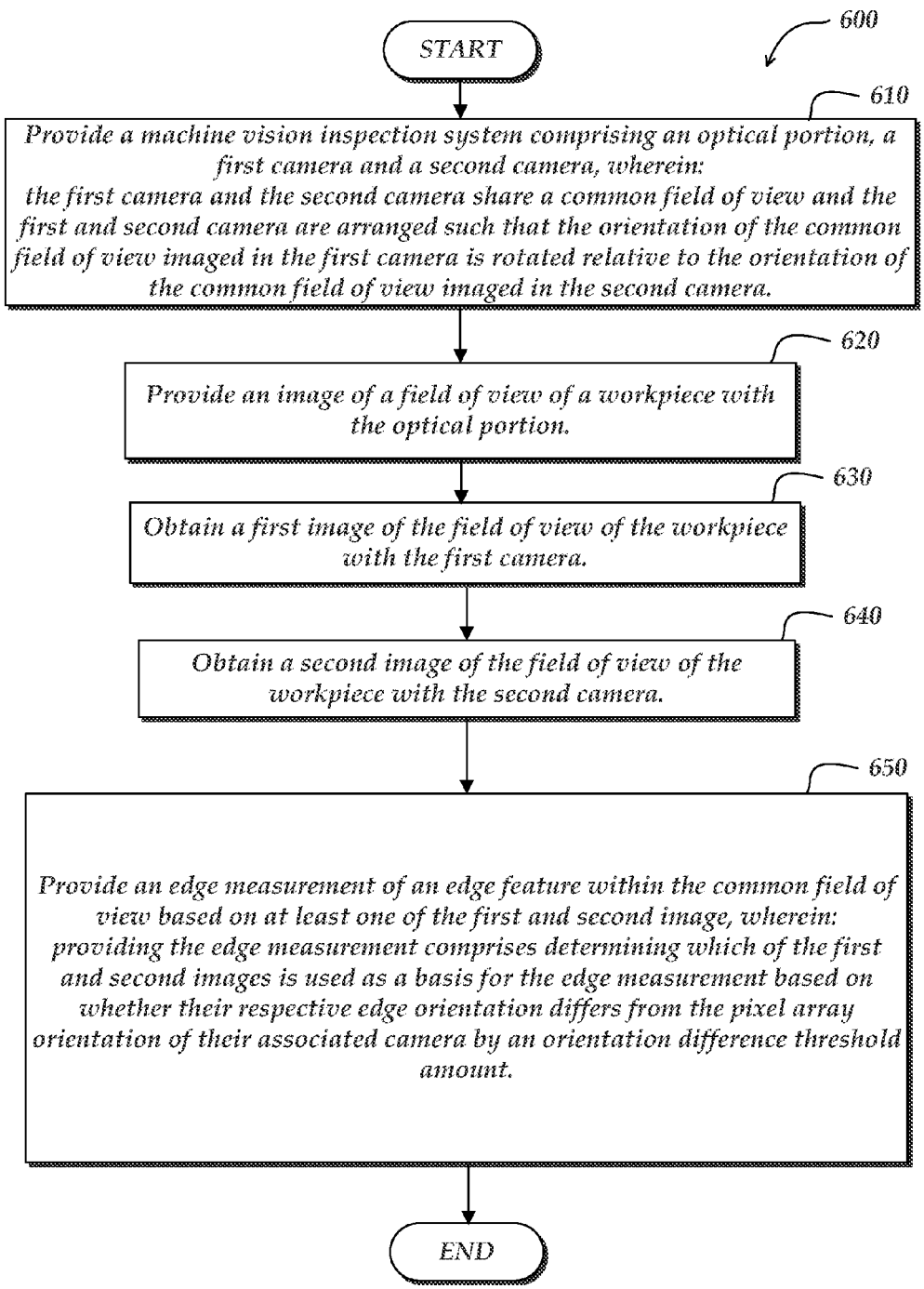
FIG. 6 is a flow diagram of a method for reducing potential undersampling or digitization errors due to strong alignment of an edge orientation with a camera pixel array orientation in machine vision inspection edge location measurements.

FIG. 6 is a flow diagram 600 of a method for reducing undersampling or digitization errors in machine vision inspection edge location measurements. At block 610, a machine vision inspection system is provided which comprises an optical portion, a first camera and a second camera, wherein: the first camera and the second camera share a common field of view and the first and second camera are arranged such that the orientation of the common field of view imaged in the first camera is rotated relative to the orientation of the common field of view imaged in the second camera. At block 620, an image of a field of view of a workpiece is provided using the optical portion.

At block 630, a first image of the common field of view of the workpiece is obtained with the first camera. At block 640, a second image of the common field of view of the workpiece is obtained with the second camera.

At block 650, an edge measurement of an edge feature within the common field of view is provided, based on one of the first and second image, wherein providing the edge measurement comprises determining which of the first and second images is used as a basis for the edge measurement based on whether their respective edge orientation differs from the pixel array orientation of their associated camera by an orientation difference threshold amount, according to principles outlined above. After the block 650 the process ends.

It should be appreciated that the two camera system and method disclosed herein may be generally transparent to a user and does not require a sophisticated user since the operations are "behind the scenes." It should be appreciated that the second camera (e.g., the camera 260') may image an edge feature which does not differ by at least the orientation difference threshold amount from the pixel array of that camera. In this case, the machine vision inspection system 100 may determine this alignment and select the first image taken by the first camera (e.g., the camera 260) as a basis for performing an edge measurement. Of course, if both of the edge feature alignments differ by at least the orientation difference threshold amount from the pixel arrays of both cameras, then the edge location determination may be based on either, or both, camera images (e.g., as an average).

While various embodiments of the invention have been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A machine vision inspection system that suppresses potential edge location measurement errors that depend on edge feature alignment, comprising:
    an optical portion configured to provide an image of a field of view of a workpiece;
    a first camera configured to provide a first image of the field of view of the workpiece; and
    a second camera configured to provide a second image of the field of view of the workpiece,
    wherein:
        the first camera and the second camera share a common field of view, and the first and second camera are arranged such that the orientation of the common field of view imaged in the first camera is rotated relative to the orientation of the common field of view imaged in the second camera; and
        the machine vision inspection system comprises signal processing which provides an edge measurement of an edge feature within the common field of view imaged by each camera and determines which of the first and second images is used as a basis for the edge measurement based on whether their respective edge orientation differs from the pixel array orientation of their associated camera by an orientation difference threshold amount.

2. The machine vision inspection system of claim 1, wherein the orientation of the common field of view imaged in the first camera is rotated relative to the orientation of the common field of view imaged in the second camera by at least one degree.

3. The machine vision inspection system of claim 1, wherein the orientation of the common field of view imaged in the first camera is rotated relative to the orientation of the common field of view imaged in the second camera by at most ten degrees.

4. The machine vision inspection system of claim 1, wherein the orientation of the common field of view imaged in the first camera is rotated relative to the orientation of the common field of view imaged in the second camera by at least twice the amount of the orientation difference threshold.

5. The machine vision inspection system of claim 1, wherein the signal processing is configured to determine a respective edge orientation by fitting a line to detected edge points of a respective edge, and determining a difference in orientation between the fitted line and a known orientation of the pixel axis of the associated camera.

6. The machine vision inspection system of claim 1, wherein the signal processing is configured to determine that a respective edge orientation differs from the pixel array orientation of the associated camera by an orientation difference threshold amount by analyzing the location of detected edge points along respective scan lines of a video tool used to measure the respective edge, and determining that the respective edge orientation differs from the pixel array orientation of their associated camera by the orientation difference threshold when the location of the detected edge points along respective scan lines of the video tool provides a combined sampling density corresponding to the orientation difference threshold amount or more.

7. A method for suppressing potential edge location measurement errors that depend on edge feature alignment in a machine vision inspection system, the method comprising:
    providing a machine vision inspection system comprising an optical portion, a first camera and a second camera, wherein the first camera and the second camera share a common field of view and the first and second camera are arranged such that the orientation of the common field of view imaged in the first camera is rotated relative to the orientation of the common field of view imaged in the second camera;
    providing an image of a field of view of a workpiece with the optical portion;
    obtaining a first image of the field of view of the workpiece with the first camera;
    obtaining a second image of the field of view of the workpiece with the second camera; and
    providing an edge measurement of an edge feature within the common field of view based on at least one of the first and second image, wherein:
        providing the edge measurement comprises determining which of the first and second images is used as a basis for the edge measurement based on whether their respective edge orientation differs from the pixel array orientation of their associated camera by an orientation difference threshold amount.

8. The method of claim 7, wherein the orientation of the common field of view imaged in the first camera is rotated relative to the orientation of the common field of view imaged in the second camera by at least one degree.

9. The method of claim 7, wherein the orientation of the common field of view imaged in the first camera is rotated relative to the orientation of the common field of view imaged in the second camera by at most ten degrees.

10. The method of claim 7, wherein the orientation of the common field of view imaged in the first camera is rotated relative to the orientation of the common field of view imaged in the second camera by at least twice the amount of the orientation difference threshold.

11. The method of claim 7, wherein determining which of the first and second images is used as a basis for the edge measurement based on whether their respective edge orientation differs from the pixel array orientation comprises determining a respective edge orientation by fitting a line to detected edge points of a respective edge and determining a difference in orientation between the fitted line and a known orientation of the pixel axis of the associated camera.

12. The method of claim 7, wherein determining whether a respective edge orientation differs from the pixel array orientation of the associated camera by an orientation difference threshold amount comprises analyzing the location of detected edge points along respective scan lines of a video tool used to measure the respective edge, and determining that the respective edge orientation differs from the pixel array orientation of their associated camera by the orientation difference threshold when the location of the detected edge points along respective scan lines of the video tool provides a combined sampling density corresponding to the orientation difference threshold amount or more.

* * * * *